March 12, 1968  J. J. DAVIN  3,373,253
PROGRAM SWITCH
Filed Oct. 21, 1965  2 Sheets-Sheet 1

INVENTOR
JEAN JULLIEN DAVIN
BY
AGENT

INVENTOR
JEAN JULLIEN DAVIN
BY [signature]
AGENT

United States Patent Office 3,373,253
Patented Mar. 12, 1968

3,373,253
PROGRAM SWITCH
Jean Jullien Davin, Valence-sur-Rhone, France, assignor to Crouzet S.r.l., Milan, Italy
Continuation-in-part of application Ser. No. 443,895, Mar. 30, 1965. This application Oct. 21, 1965, Ser. No. 499,948
Claims priority, application Italy, Feb. 20, 1965, 3,570/65
9 Claims. (Cl. 200—38)

ABSTRACT OF THE DISCLOSURE

The program control cams of a program switch are driven by a rotating coaxial wheel through an overriding clutch when the clutch is engaged by its solenoid operated actuator. The energizing circuit of the actuator has three parallel switches, the first being closed once during each revolution of the wheel, the second by the pawl of a ratchet attached to the control cams while the ratchet turns through one tooth spacing, and the second by a cam attached to the control cams. The control cams operate switches in an external circuit such as that of a washing machine.

---

This application is a continuation-in-part of my copending application Ser. No. 443,895, filed on Mar. 30, 1965, now patent No. 3,319,018.

This invention relates to an improvement in the program switch disclosed and claimed in my earlier filed application, and particularly to an improved and simplified arrangement for indexing the switch cams which operate the principal program elements.

My earlier invention provided a program switch requiring two drive inputs, namely an indexing drive and a continuous drive for moving the afore-mentioned switch cams through their indexing steps at a speed sufficiently high that the practically instantaneous operation of the principal program elements could not initiate movement of the associated elements controlled by the program switch.

A primary object of the instant invention is the provision of an indexing arrangement which is an integral part of the program switch, whereby the switch needs to be provided with a single continuous drive only.

Another object is the provision of an indexing drive which utilizes elements of my earlier program switch for performing additional indexing functions so that the complexity of the switch is not significantly increased by the added function.

With these and other objects in view, as will presently become apparent, the improved program switch of the instant invention includes a drive arranged for continuous rotation at substantially constant speed, a rotary control cam and at least one program control element engageable by the cam during rotation of the latter for operating the element, a normally disengaged clutch connecting the control cam with the drive, an indexing device which responds to a predetermined angular position of the drive for engaging the clutch so as to index the cam through a first angle which is substantially smaller than a full revolution, and a control device jointly rotating with the cam for engaging the clutch in response to a predetermined angular position of the cam, and for thereby rotating the cam through a second angle, normally greater than the afore-mentioned first angle.

Figure 1:
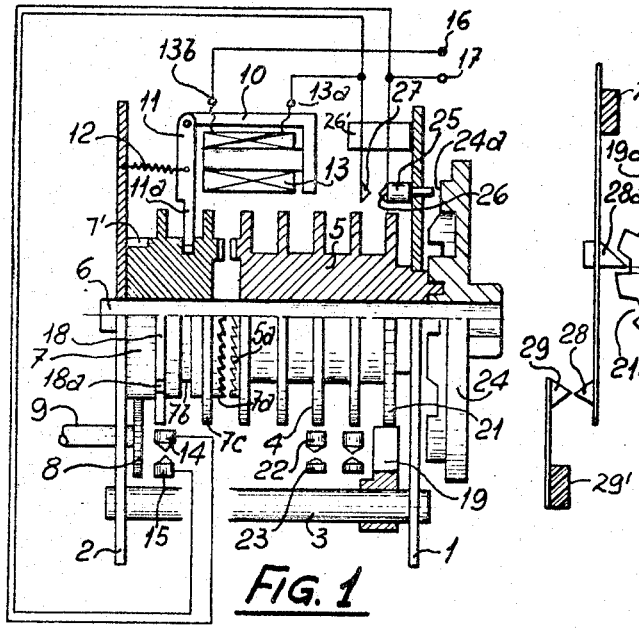
Figure 2:
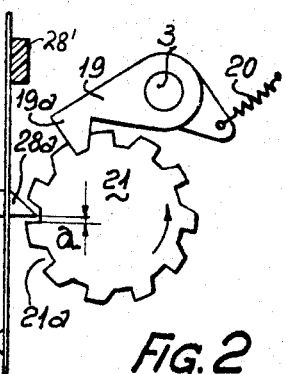
Figure 3:
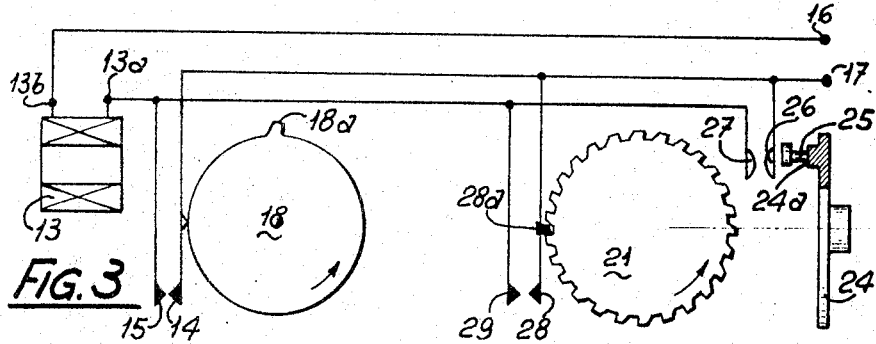

Other features and advantages of this invention will be readily appreciated from the following detailed description when considered with the appended drawing in which FIG. 1 shows a rotary program switch of the invention in plan view, and partly in plan section on its axis of rotation;
FIG. 2 shows a detail of the apparatus of FIG. 1 in front elevation, and partly in section;
FIG. 3 is a partial circuit diagram of the program switch; and
FIGS. 4 to 7 are corresponding circuit diagrams of modified switches of the invention.

The switches of the invention are well adapted for programming automatic laundry washers or dishwashers, and will be described hereinafter with specific reference to such applications. It will be understood, however, that the invention is not limited to specific applications of the program switch.

Referring now to the drawing in detail, and initially to FIG. 1, there are shown two parallel spaced plates 1, 2 which are connected by several spacers 3 to from the supporting frame of a program switch, only one spacer 3 being visible in the drawing. Four edge cams 4 integrally projecting from a cylinder 5 move associated contacts 22 into engagement with fixed contacts 23 when the cylinder 5 rotates about its axis on a shaft 6 to which it is fixedly attached, and which is journaled in the plates 1, 2. The several paired contacts 22, 23 constitute the principal normally open control elements of the apparatus and may be connected with the solenoid valves and electrically operated clutches of a washing machine for operating the same in a conventional manner. Only two pairs of contacts have been shown in FIG. 1 in order not to crowd the drawing. The manner in which the contacts 22, 23 are attached to the frame 1, 2, 3 has not been shown in detail, and will be described hereinafter with reference to contacts 26, 27.

A wheel 7 is freely rotatable and axially slidable on the shaft 6. It is provided with a gear rim 7' which meshingly engages a drive pinion 8 on the output shaft 9 of a constant-speed motor, not otherwise shown, which may be a conventional synchronous AC motor. The wheel 7 carries two integral edge cams 7c, 18. The cam 7c operates a non-illustrated switch in the manner of the cams 4 for reversing the direction of rotation of an impeller or the like in an associated washing machine in a manner conventional in itself, and not directly relevant to this invention.

Saw-toothed rims 5a, 7a oppositely arranged on the cylinder 5 and the wheel 7 constitute the driven and driving parts of an overriding claw clutch which may be engaged by axial movement of the wheel 7 toward the cylinder 5 from the illustrated position when a solenoid 10 is energized. The hingedly mounted armature 11 of the solenoid 10 has a free end portion 11a which engages a circumferential groove 7b in the wheel 7. A helical tension spring 12 normally disengages the clutch by pulling the armature 11 away from the core of the solenoid winding 13.

One terminal 13b of the winding 13 is connected with an outlet terminal 16 of a current supply circuit, not otherwise illustrated. The other solenoid terminal 13a may be connected with the other outlet terminal 17 by any one of three normally open switches arranged in parallel as best seen in FIG. 3.

The first switch is constituted by a movable contact 14 and a fixed contact 15, substantially identical with the afore-mentioned contacts 22, 23, and arranged for closing by a narrow projecting lobe 18a on the edge cam 18 once during each revolution of the wheel 7 regardless of the axial position of the wheel.

Movement of the cylinder 5 in a direction opposite to its movement by the motor shaft 9 is prevented by a ratchet arrangement best seen in FIG. 2. A ratchet disk 21 integral with the cylinder 5 has circumferentially spaced notches 21a which have an approximately flat bottom, one steep radial flank, and one flank obliquely sloping toward the circumference. The ratchet disk 21 cooperates with a pawl 19 which is pivoted on the spacer 3, and whose tooth 19a conforms to the notches 18a and is urged inward of the notches by a helical tension spring 20, thereby yieldably resisting rotation of the disk 21, of the cylinder 5, and of the shaft 6 in the direction of the arrow, but preventing rotation in the opposite direction.

The disk 21 also operates the second switch in the supply circuit of the solenoid winding 13. The switch is constituted by a movable, resilient contact blade 28 and a fixed contact 29 respectively attached to the front plate 1 by insulators 28', 29' in a manner not shown in detail. A detent 28a attached to the contact 28 travels over the circumference of the disk 21, and is urged into the notches 21a by the resilience of the contact 28.

The third switch is operated by a control disk 24 releasably mounted on the shaft 6 outside the front plate 1 and engaging the cylinder 5 for joint rotation therewith. The disk 24 may be angularly shifted relative to the cylinder 5 in increments corresponding to the angular spacing of the notches 21a as is shown in more detail in the afore-mentioned copending application. A circular cam track 24a projects axially from the disk 24 for engagement with a push button 25 which is slidably received in an opening of the front plate and abuts against the movable contact 26 of the third switch. The contact 26 and the fixed contact 27 of the third switch are jointly mounted on the inner face of the front plate 1 by an insulator 26'.

The afore-described program switch operates as follows:

The wheel 7 is rotated at a uniform speed by the pinion 8. When the cam lobe 18a on the wheel 7 closes the contacts 14, 15, the solenoid 10 is energized for a period at least long enough to permit full engagement of the toothed rims 5a, 7a. It will be understood that the springs 12, 20 are selected in such a manner as to prevent rotation of the cylinder 5 and of the elements associated therewith until the clutch is fully engaged. When the rotary movement of the shaft 6 is initiated, the wedge-shaped detent 28a is displaced outward of the notch 21a in which it is received when the shaft 6 stands still, and keeps the solenoid 10 energized until the detent drops abruptly into the next notch 21a over the steep radial flank of the latter. Since the decay of the magnetic field of the winding 13 takes a certain finite time, and the withdrawal of the wheel 7 by the spring 12 is not instantaneous, the detent 28a travels a small distance $a$ in the next notch before the pawl 19 arrests further inertial movement of the cylinder 5. The cams 4 are thereby indexed one step.

The intermittent indexing movement continues as long as the control disk 24 does not engage the push butttton 25. When the button 25 is depressed by the cam track 24a, the solenoid 10 remains energized, and the indexing movement of the shaft 6 and of the cams 4 mounted thereon is replaced by a continuous movement through an angle corresponding to several indexing steps at the rotary speed of the wheel 7 in which the contacts 22, 23 are only instantaneously closed for periods too short for causing actual movement of the associated valves, clutches, or other controlled devices. The omission of any desired step or steps from the basic program defined by the configuration of the cams 4 may thus be achieved by replacing the control disk 24 by another disk having a different cam track 24a, or by changing the angular position of the disk 24 on the shaft 6.

Figure 4:
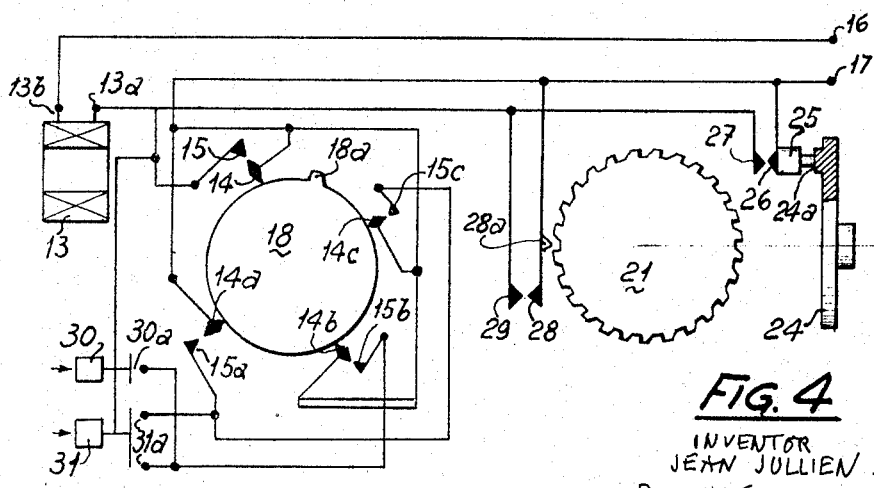

The modified program switch diagrammatically illustrated in FIG. 4 differs from the apparatus shown in FIGS. 1 to 3 by the provision of three additional switching units constituted respectively by paired contacts 14a, 15a; 14b, 15b; and 14c, 15c in the path of the cam lobe 18a and angularly offset from the contacts 14, 15 by integral multiples of 90°. There are also provided two push button control switches. The button 30 operates a normally open SPST switch 30a, and the button 31 operates a normally open DPST switch 31a. The several movable contacts 14, 14a, 14b, 14c are conductively connected to each other and to the current supply terminal 17. The fixed contact 15 is permanently connected to the solenoid terminal 13a. The contacts 15a and 15c are connected to one fixed contact of the switch 31a whose other fixed contact is connected to the fixed contact of the switch 30a and to the contact 15b.

During each revolution of the wheel 7 by the motor shaft 9, the cam lug 18a sequentially closes each of the four pairs of contacts arranged about the wheel circumference once. In the illustrated position of the switches 30a, 31a, the device of FIG. 4 functions as described hereinabove with reference to FIGS. 1 to 3. When the push button 30 is depressed, the shaft 6 and the associated cams 4 are indexed twice during each revolution of the wheel 7. When the push button 31 is depressed, four indexing movements are performed by the shaft 6 during each revolution of the wheel 7. The push buttons 30, 31 thus permit the operating cycles available from the cams 4 in cooperation with one or several interchangeable control disks 24 to be shortened to one-half or to one-quarter of their maximum length. Obviously, the buttons 30, 31 may be depressed during a portion of the cycle only, thereby permitting further selective modification of the basic program for which the cams 4 are shaped in a known manner.

It will be understood that a conventional arrangement is provided for returning the push buttons 30, 31 to their initial positions from their depressed positions, and this has not been shown in order not to crowd the drawing.

Figure 5:
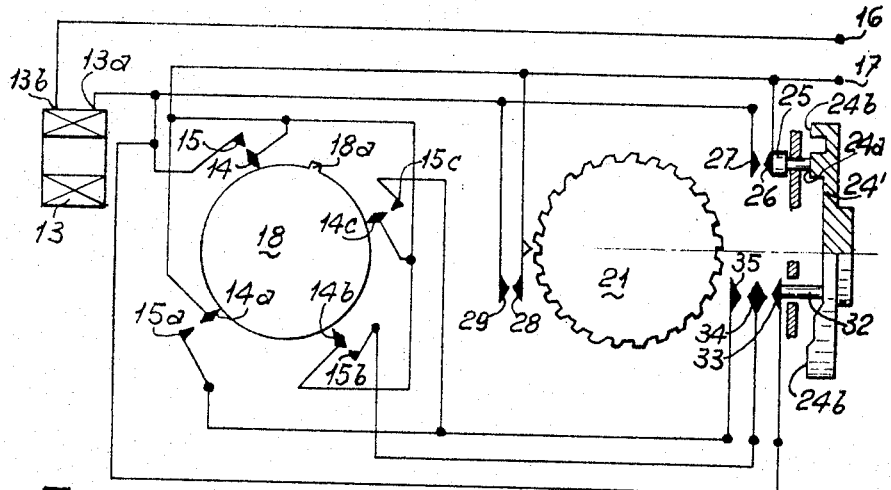

If the intended modified programs of higher speed operation are limited in number, they may be performed fully automatically, without need for pressing a button, by a modification of the control disk 24. The program switch shown in FIG. 5 is basically similar to the apparatus more fully shown in FIGS. 1 to 3, and is equipped with the four sets of contacts arranged about the circumference of the wheel 7 as described with reference to FIG. 4.

A control disk 24', which otherwise corresponds to the disk 24 described hereinabove, is provided with an auxiliary cam track 24b engageable with a push button 32 of insulating material slidably received in an opening of the front plate 1. The cam track 24b has three axial levels, and the button 32 operates a switch having three contacts 33, 34, 35. When the button 32 travels over the first level of the track 24b, as illustrated, the contacts 33, 34, 35 are spaced from each other. Shifting of the button 32 to the intermediate track level, causes engagement of the contacts 33, 34 and all three contacts of the switch engage each other when the button 32 is fully depressed by the third level of the track 24.

The contact 33 is conductively connected to the solenoid terminal 13a, the contact 34 is connected to the contact 15b, and the contact 35 to the contacts 15a and 15c. The angular position of the control disk 24' thus determines the frequency of the indexing movement as well as the replacement of the indexing movement by continuous movement of the shaft 6.

Obviously, further modifications of the invention are readily possible without departing from its spirit. The number of switches cooperating with a single cam lug 18a may be smaller or greater than four, and any desired combination of different indexing frequencies may be arrived at by connecting such switches in series with push button switches, or by automatically selecting them by suitable control disks or other cam arrangements permanently or intermittently connected to the shaft 9. It will also be apparent that more than one cam lug corresponding to the lug 18a may be provided on the wheel 7, and such multiple lugs may be arranged in a common radial plane for cooperation with a single switch or in axially spaced radial planes for cooperation with respective multiple switches.

Figure 6:
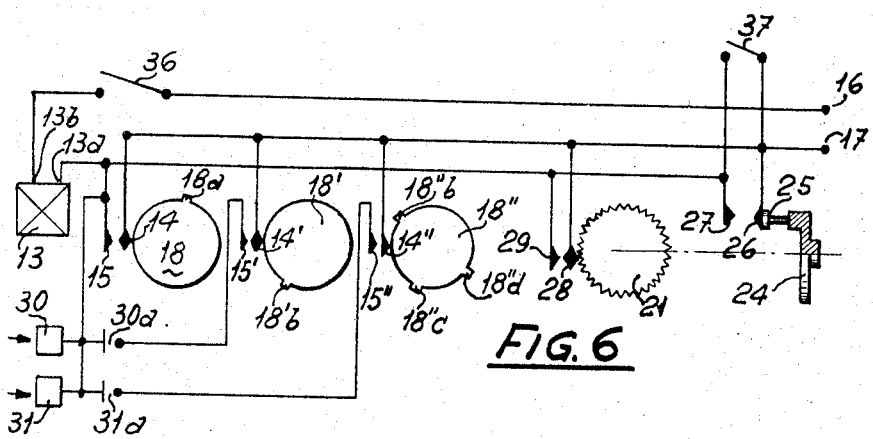
Figure 7:
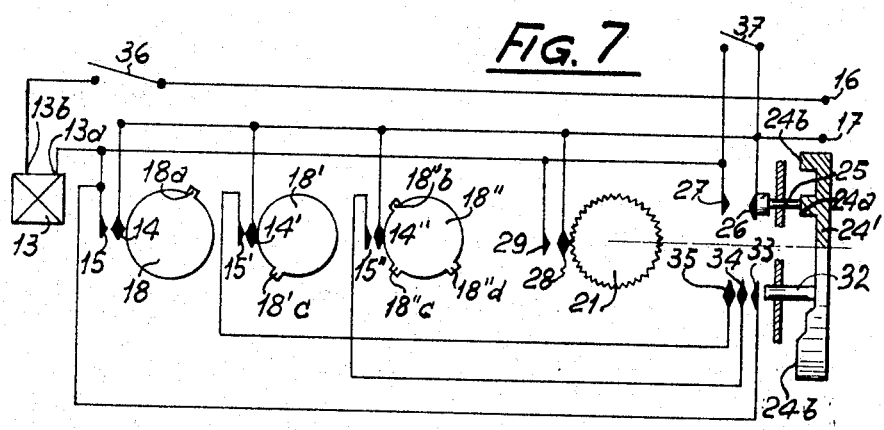

Merely by way of illustration of such additional modifications, FIGS. 6 and 7 show a device otherwise identical with that illustrated in FIG. 1, wherein the wheel 7 is provided with two additional cams 18′, 18″. The cam 18′ has a single lug 18′b diametrically opposite the lug 18a on the cam 18. The cam 18″ has three cam lugs 18″b, 18″c, and 18″d which are respectively offset 90°, 180°, and 270° from the position of the lug 18a. Contacts 14′, 14″ connected to the current supply terminal 17 are moved into engagement with corresponding fixed contacts 15′, 15″ by the cam lugs of the associated edge cams. A switch 30a operated by a push button 30 can connect the contact 15′ to the solenoid terminal 13a. A switch 31a similarly connects the contact 15″ to the solenoid terminal if a push button 31 is depressed. The frequency of indexing movement of the associated cams 4 is thus doubled when the button 30 is depressed, and quadrupled when the button 31 is depressed. The return mechanism for the buttons has not been shown.

A switch 36 in the current supply line connecting the terminals 16 and 13b may be thermostat operated to prevent the energizing of the clutch actuating solenoid 10 unless the water temperature in the washer reaches a set minimum temperature, and a manual switch 37 permits the solenoid 10 to be energized independently of the automatically controlled switches.

The program switch illustrated in FIG. 7 differs from that shown in FIG. 6 as the devices illustrated in FIGS. 5 and 4 differ from each other. The control disk 24′ has an auxiliary track 24b which operates a push button 32 to connect the contact 33 with a contact 34 and additionally with a contact 35, the contacts 34, 35 respectively being connected to the contacts 15′, 15″ of switches arranged in the same manner as described with reference to FIG. 6. The apparatus of FIG. 7 operates in the same manner as that shown in FIG. 5.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A program switch comprising, in combination:
    (a) drive means arranged for continuous rotation at substantially constant speed;
    (b) a rotary control cam;
    (c) a program control element engageable by said cam during rotation of the latter for operation of the element by the cam;
    (d) normally disengaged clutch means having a driving part and a driven part connected to said control cam and to said drive means respectively for movement therewith;
    (e) electrically operated clutch actuator means connected to said clutch means and energizable for engaging said parts of the same;
    (f) energizing means for energizing said clutch actuator means, said energizing means including
        (1) first switch means responsive to the angular position of said drive means and in circuit with said actuator means for energizing the same in a predetermined angular position of the drive means;
        (2) second switch means in circuit with said actuator means and responsive to the rotary movement of said control cam through a first angle substantially smaller than one revolution for keeping said clutch actuator means energized during said rotary movement of the control cam, and
        (3) third switch means responsive to a predetermined angular position of said control cam for keeping said actuator means energized for a period sufficient to rotate said control cam through a second angle greater than said first angle and smaller than one revolution; and
    (g) ratchet means for releasably arresting said control cam after rotation thereof through said first angle.

2. A switch as set forth in claim 1, wherein said ratchet means include first and second ratchet members, one of said members being fixedly fastened to said control cam, the first member being formed with notches spaced about the axis of rotation of said cam, yieldably resilient means urging the second ratchet member into engagement with said notches, and means securing the other ratchet member against rotary movement about said axis.

3. A switch as set forth in claim 2, wherein said energizing means further include motion transmitting means operatively interposed between said one ratchet member and said second switch means for operating the same in response to the angular position of said one ratchet member relative to said axis.

4. A switch as set forth in claim 3, wherein said drive means include a wheel member arranged for rotation about said axis, one of said parts of the clutch means being operatively connected to said clutch actuator means for engagement with the other part by said actuator means, said parts being respectively fixedly fastened to said wheel member and to said control cam, said drive means further including motion transmitting means operatively interposed between said wheel member and said first switch means for operating the same in response to the angular position of said wheel member.

5. A switch as set forth in claim 4, further comprising motion transmitting means operatively interposed between said control cam and said third switch means for operating the same in response to the angular position of said control cam.

6. A switch as set forth in claim 1, wherein: said drive means include a wheel member coaxial with said control cam, and actuating means for continuously rotating said wheel member about the common axis of said wheel member and of said cam;

said parts of the clutch means are respectively fixedly fastened to said wheel member and to said control cam, and said electrically operated clutch actuator means operatively connected to one of said clutch parts for engaging the same with the other clutch part;

said energizing means include first motion transmitting means fixedly fastened to said wheel member for operating said first switch means in response to the angular position of said wheel member;

said ratchet means include a ratchet member mounted on said control cam for joint rotation therewith about said axis and being formed with a plurality of circumferentially spaced notches, a pawl member secured against rotary movement about said axis, yieldably resilient means urging said pawl member into engagement with said notches, and second motion transmitting means interposed between said ratchet member and said second switch means and engageable with said notches for operating said second switch means in response to the angular position of said ratchet member, the spacing of said notches corresponding to said first angle;

a control member releasably fastened to said control cam for joint rotation therewith about said axis, and third motion transmitting means interposed between said control member and said third switch means for operating the same in response to the angular position of said control member and for thereby rotating said control cam through said second angle.

7. A switch as set forth in claim 6, wherein said first switch means include a plurality of switching units, and said first motion transmitting means include means for selectively operating said switching units in response to respective angular positions of said wheel member, and control switch means in series circuit with at least one of said switching units for selectively connecting the unit in said circuit with the clutch actuator means.

8. A switch as set forth in claim 7, further including manual operating means for operating said control switch means.

9. A switch as set forth in claim 7, further comprising fourth motion transmitting means for operating said control switch means in response to the angular position of said control member.

References Cited

UNITED STATES PATENTS

| | | | |
|---|---|---|---|
| 2,391,718 | 12/1945 | Lindemann | 200—38 |
| 3,188,504 | 6/1965 | Anderson | 200—38 |
| 3,319,019 | 9/1967 | Jullien-Davin | 200—38 |

BERNARD A. GILHEANY, *Primary Examiner.*

H. E. SPRINGBORN, R. COHRS, *Assistant Examiners.*